US010606707B2

(12) United States Patent
Brewer et al.

(10) Patent No.: US 10,606,707 B2
(45) Date of Patent: Mar. 31, 2020

(54) ENHANCING ROBUSTNESS OF A DATABASE APPLICATION

(71) Applicant: International Business Machines Corporation, Armonk, NY (US)

(72) Inventors: Billy S. Brewer, Kailua, HI (US); Patrick B. Heywood, Louisville, CO (US); Bernhard J. Klingenberg, Morgan Hill, CA (US); Nagapramod S. Mandagere, San Jose, CA (US); Steven Pantridge, Delson (CA); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 15/806,461

(22) Filed: Nov. 8, 2017

(65) Prior Publication Data

US 2018/0067818 A1 Mar. 8, 2018

Related U.S. Application Data

(63) Continuation of application No. 14/029,911, filed on Sep. 18, 2013, now Pat. No. 9,898,372.

(51) Int. Cl.
*G06F 17/30* (2006.01)
*G06F 11/14* (2006.01)
*G06F 16/22* (2019.01)

(52) U.S. Cl.
CPC ...... *G06F 11/1458* (2013.01); *G06F 11/1461* (2013.01); *G06F 16/22* (2019.01)

(58) Field of Classification Search
CPC ............ G06F 11/1458; G06F 11/1461; G06F 11/1474; G06F 16/22; G06F 2201/80
See application file for complete search history.

(56) References Cited

U.S. PATENT DOCUMENTS 7,636,872 B2 12/2009 Kramer et al.
8,260,750 B1 9/2012 Gugick et al.
(Continued)

OTHER PUBLICATIONS

Office Action (dated Mar. 10, 2017) for U.S. Appl. No. 14/029,911, filed Sep. 18, 2013.
(Continued)

*Primary Examiner* — Alicia M Willoughby
(74) *Attorney, Agent, or Firm* — Schmeiser, Olsen & Watts; William H. Hartwell

(57) ABSTRACT

A method and associated systems for backing up a target computer application that comprises identifying and backing up databases and other information repositories upon which the target application depends. The target application is identified and related to a backup requirement that specifies a minimum application-backup frequency. The application's "dependencies" are automatically identified from sources that include configuration files, where each dependency identifies one or more databases or other information repositories that store information upon which the application directly or indirectly depends. If any of these databases or repositories is associated with a backup frequency less than the application's minimum backup frequency, the database or repository is flagged. Each flagged entity's backup schedule is then revised so that the flagged entity's backup frequency is equal to or greater than the application's minimum backup frequency.

20 Claims, 6 Drawing Sheets

(56) References Cited

U.S. PATENT DOCUMENTS

| | | |
|---|---|---|
| 8,315,992 B1 | 11/2012 | Gipp et al. |
| 8,429,140 B1 * | 4/2013 | Lolayekar ............. G06F 16/289 |
| | | 707/694 |
| 8,959,058 B1 | 2/2015 | Kleinschnitz et al. |
| 8,959,065 B2 | 2/2015 | Gorievsky |
| 2005/0015641 A1 | 1/2005 | Alur et al. |
| 2007/0078972 A1 | 4/2007 | Yagishita |
| 2008/0154979 A1 | 6/2008 | Saitoh et al. |
| 2008/0208929 A1 | 8/2008 | Phillipi |
| 2009/0192979 A1 | 7/2009 | Lunde |
| 2010/0082925 A1 * | 4/2010 | Irisawa ................. G06F 3/0605 |
| | | 711/162 |
| 2010/0198791 A1 | 8/2010 | Wu et al. |
| 2010/0324945 A1 | 12/2010 | Hessing |
| 2012/0089572 A1 | 4/2012 | Raichstein et al. |
| 2013/0318229 A1 | 11/2013 | Bakre et al. |
| 2015/0046230 A1 | 2/2015 | Laksman et al. |
| 2015/0081641 A1 | 3/2015 | Brewer et al. |

OTHER PUBLICATIONS

Amendment (dated Mar. 23, 2017) for U.S. Appl. No. 14/029,911, filed Sep. 18, 2013.
Notice of Allowance (dated Oct. 10, 2017) for U.S. Appl. No. 14/029,911, filed Sep. 18, 2013.

* cited by examiner

_US 10,606,707 B2_

ENHANCING ROBUSTNESS OF A DATABASE APPLICATION

This application is a continuation application claiming priority to Ser. No. 14/029,911, filed Sep. 18, 2013, now U.S. Pat. No. 9,898,372, issued Feb. 20, 2018.

TECHNICAL FIELD

The present invention pertains to backing up computer data.

BACKGROUND

To satisfy user requests, a software application may access data directly from one database, and may query other applications to obtain additional data from another database or results of processing based on additional data from another database. It was known to establish a minimum backup frequency for databases used by an application, but the identification of the databases was manual. It is common today for an application and the databases it uses to span physically distinct sites, business units, or computing platforms, so it may be difficult to identify different databases used directly or indirectly by an application.

An object of the present invention is to establish a minimum backup frequency for all databases used directly or indirectly by a specified application.

BRIEF SUMMARY

The present invention resides in a system, program product and method for managing the backup of databases that directly or indirectly provide data to a first application. A programmed computer processor queries a configuration file to identify a second application that is queried by the first application in response to a request of a user of the first application. The processor then identifies a database that is accessed by the second application in response to the first application's query. The processor then determines whether the second application's database is backed up at least as often as other databases that are used by the first application or at least as often as a specified minimum frequency. If the other databases are backed up more often, then the processor generates an electronic notification that the backup frequency of the second application's database should be increased to at least the minimum backup frequency of the first application's database.

DETAILED DESCRIPTION

Figure 1:
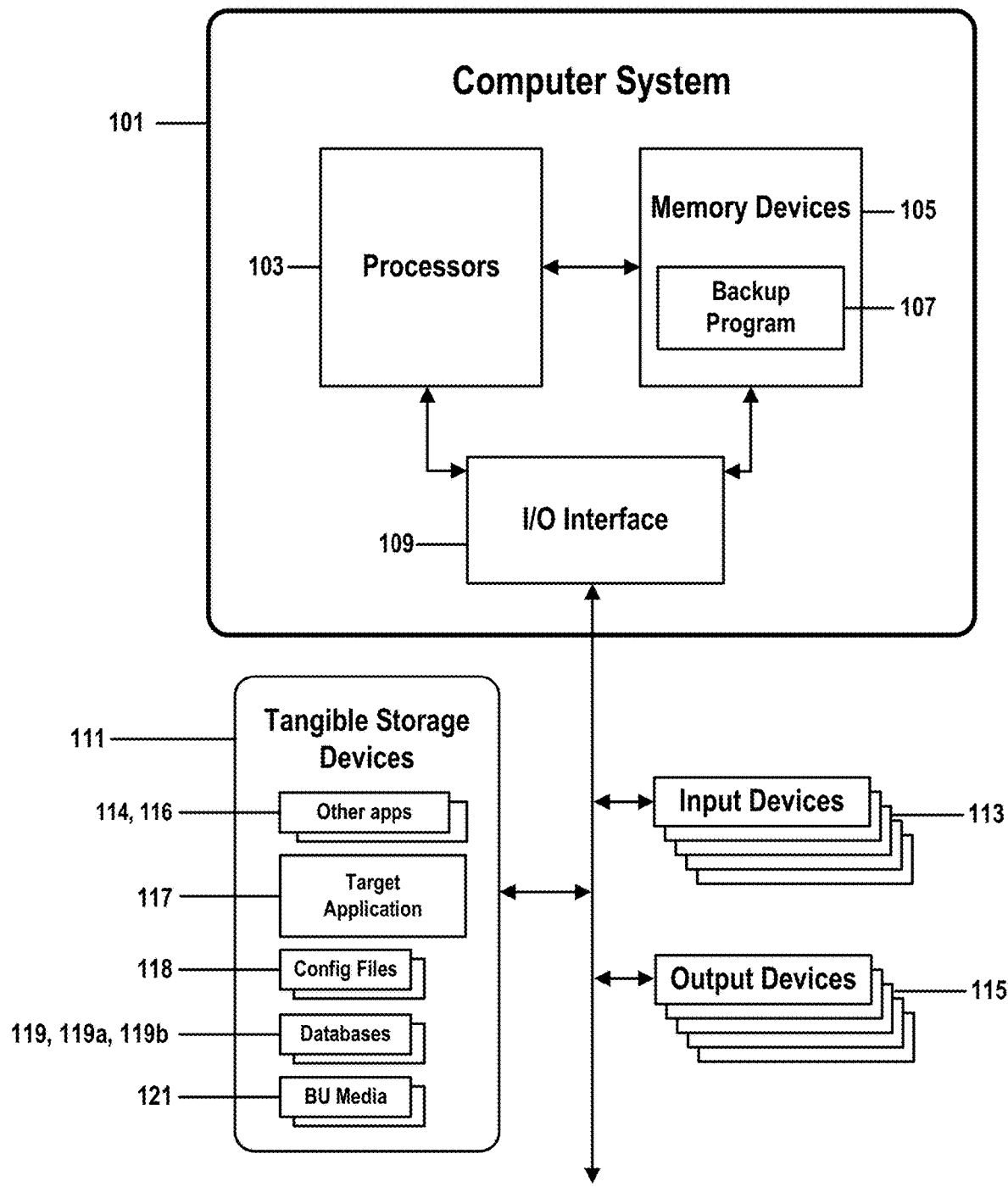
FIG. 1 shows a computer system and backup program [Comment: the function of program 107 is to manage backup; this is not "may be".] to manage backup of databases used directly or indirectly by a computer application in accordance with embodiments of the present invention.

The present invention will now be described in detail with reference to the figures. FIG. 1 shows a computer system and computer program that may be used to backup a computer application in accordance with embodiments of the present invention.

FIG. 1 illustrates a computer system, generally designated 101, for managing backup of databases used directly or indirectly by an application 117. Computer system 101 comprises a computer 101 with a backup management program 107 stored on a hard drive 105 for execution by a processor 103. As explained in more detail below, the backup management program 107 determines that target application 117 uses databases 119, 119a, and 119b directly or indirectly. Program 107 also determines the current respective backup frequencies for each of the databases 119, 119a, and 119b, whether these backup frequencies comply with a minimum backup frequency required by service contract, best practices, or otherwise for all databases used directly or indirectly by application 117. Each of the databases 119, 119a, and 119b may comprise a combination of databases, knowledge bases, aggregations of multimedia content, transactional records, logs, tablespaces, and unstructured information archives.

In related embodiments, the method of the present invention may be used to determine backup frequencies of other entities in the same way, where an entity of the other other entities may be a software application, a logical entity, or a sub-component of the target application 117. Here, a sub-component of target application 117 is a component of target application 117, such as a software utility, subroutine, communications service, or other service that performs a function for target application 117.

For example, application 117 may access data directly from a database 119 by direct query to database 119. In the illustrated embodiment, application 117 also calls other applications 114 and 116 to obtain data from other, respective databases 119, 119a, and 119b, or results of processing based on data from the other databases 119, 119a, and 119b. Application 117 may also make requests to application 116 for other data or results of processing of other data from another database 119a or 119b and application 116 obtains the other data from database 119.

For example, application 117 is a web-commerce application that interfaces to a customer who wants to buy a type of product, and who initially describes the type of product with keywords. Target application 117 queries application 116, which is hosted by a product vendor, for a list of products that comply with the product type requested by the customer and described by the keywords. To respond to the request from application 117 to satisfy the request from the customer, application 116 obtains pertinent product data from the product vendor's database 119.

As another example, application 117 is an ERP ("Enterprise Resource Planning") application which is dependent upon information provided by (i) application 116 which is a CRM (Customer Relationship Management) application and (ii) application 114 which is a SCM ("Supply Chain Management") application. ERP application 117 is dependent on database 119 for data and can directly access database 119 by queries for data CRM application 116 is dependent on database 119a for data and can directly access database 119a by queries for data. SCM application 114 is dependent on database 119*b* for data and can directly access database 119*b* by queries for data. In this example, ERP application 117 requests information from CRM application 116 in order to satisfy a customer request. CRM application 116 requests data from database 119*a* to respond in part to this request. CRM application 116 also makes a request to SCM application 114 in order to respond to the request made by ERP application 117. SCM application 114 requests data from database 119*b* to respond to this request.

According to the present invention, a system administrator specifies to backup management program 107 a minimum backup frequency for all databases used directly or indirectly by application 117. In response, backup program 107 identifies all the databases, such as databases 119, 119*a*, and 119*b*, used directly or indirectly (by requesting services from other applications 114 and 116) by application 117, and takes steps to confirm or implement the minimum backup frequency. Because databases 119, 119*a*, and 119*b* may reside in different data centers or be under direct control of other owners, each of the databases 119, 119*a*, and 119*b* may currently be backed up according to different backup frequencies which may not meet the minimum frequency specified for application 117. Consequently, if databases 119, 119*a*, and 119*b* are "down" either due to a failure of their respective database management systems or network outage, their respective backup storage systems 121*a* and 121*b* may contain stale data that is invalid, inconsistent, outdated, or otherwise inappropriate for use for a current request to application 117.

As explained in more detail below, backup program 107 uses information culled from configuration files 118 of application 117 and from other sources to identify all databases upon which application 117 directly or indirectly depends (based on requests to supporting applications 114 and 116 and the data needed by the supporting applications to respond to the requests to application 117). These dependencies may identify applications or databases that store information that is directly or indirectly accessed, forwarded, or otherwise used by the application. Next, backup program 107 determines the current backup frequency of all the direct and indirect databases and whether the respective backup frequencies meet the minimum backup frequency of application 117. If unable to confirm a satisfaction of such a condition for a particular database, backup program 107 can either (a) send an alert to the system administrator that the minimum backup frequency is not met for a specified database and explain how application 117 depends on the database, and (b) request a database manager for the specified database to increase its backup frequency.

Figure 1A:
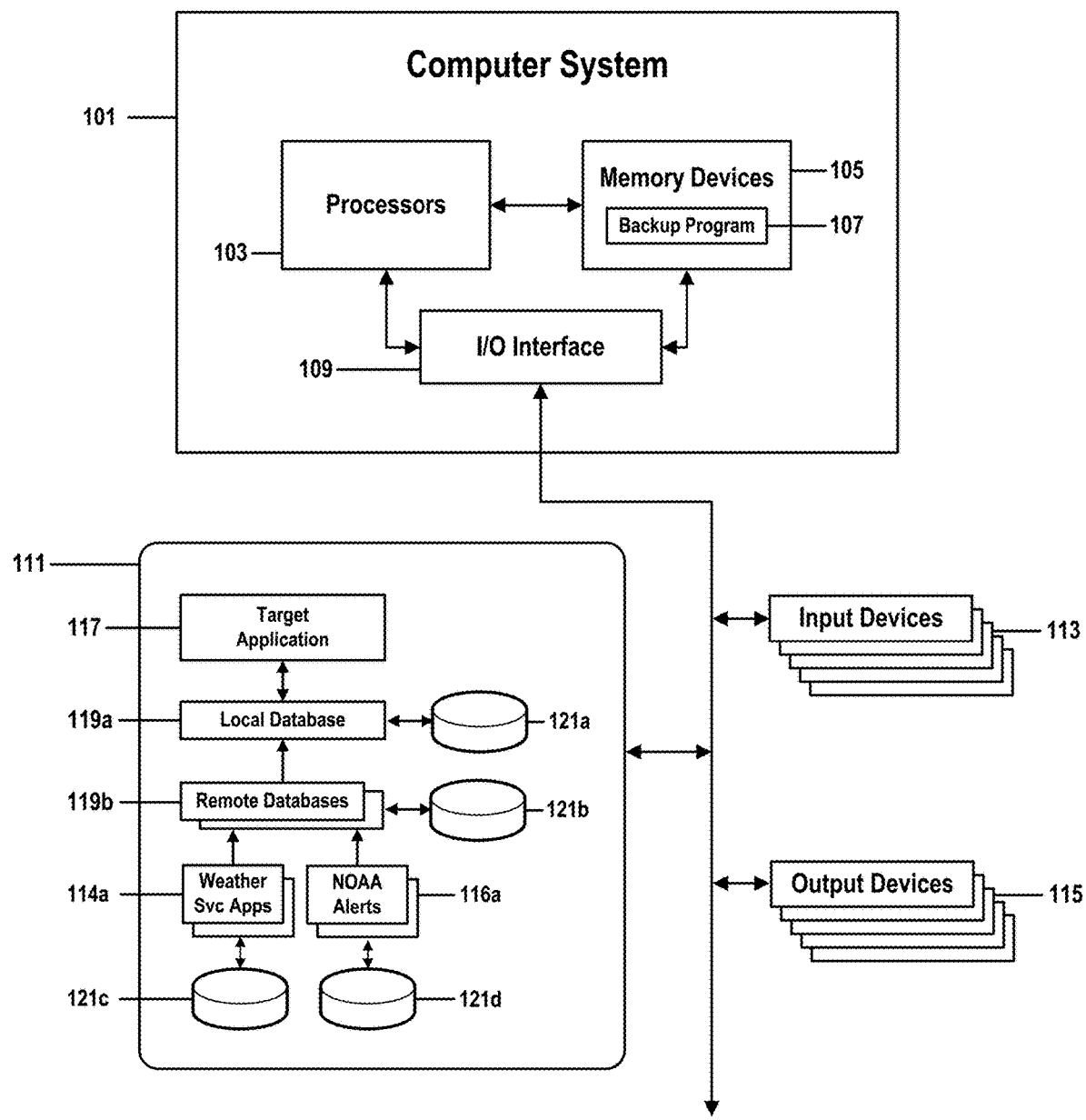
FIG. 1A shows an embodiment of the computer system and backup program of FIG. 1.

FIG. 1A shows one embodiment of the computer system and computer program 101-121 of FIG. 1.

In this example, target software application 117 is a program that displays weather forecasts, where the weather forecasts are expected to be updated hourly. Upon receiving a request from a user for a weather forecast for a specified location, application 117 retrieves the corresponding weather information from a local database 119*a* and displays the retrieved information to the user. The application 117 thus depends upon the information stored in the local database 119*a*, and such information needs to be reasonably current, i.e. recently updated with the latest forecast.

Local database 119*a* stores weather information that is from time to time aggregated from one or more remote databases 119*b* that are in turn from time to time updated from information provided by one or more local weather-service applications 114*a* and from a National Oceanic and Atmospheric Administration (NOAA) emergency-alert service 116*a*. The local database 119*a* thus depends upon information provided by (a) the remote databases 119*b*, (b) the weather-service applications 114*a*, and (c) the NOAA application/service 116*a*.

In this example, local database 119*a* is backed up to a backup storage device 121*a*, the remote databases 119*b* are backed up to one or more backup storage devices 121*b*, the one or more weather-service applications 114*a* are backed up to one or more backup storage device 121*c*, and the NOAA emergency-alert service 116*a* is backed up to a backup storage device 121*d*.

Here, target application 117's local database 119*a* is backed up to the backup storage device 121*a* according to a target application backup procedure that comprises a minimum application backup frequency. This backup procedure allows the target application 117 to recover weather data recently stored in local database 119*a* from the backup storage device 121*a* should an event corrupt or make unavailable the local database 119*a*.

In this example, a system administrator might specify a minimum application backup frequency that backs up application 117 and local database 119*a* once per hour, intending to ensure that, should an outage occur, the backup system will restore the local database 119*a* (and the application 117) with data from backup storage device 121*a* that is no more than one hour old or, alternatively, application 117 can access the data (which is no more than one hour old) from the backup storage device.

This goal may fail, however, if any of the remote databases 119*b* are backed up less often than the application's minimum backup frequency. If, for example, an outage requires both the local and remote databases 119*b* to be restored from backups, one of the remote databases 119*b* that is backed up every four hours to storage medium 121*b* may be restored with information that is older than the information loaded into the application's local database 119*a* from storage medium 121*a*. In such a case, the next time that the local database 119*a* is updated with weather information from the remote databases 119*b*, information already stored in the local database 119*a* may be replaced by older information stored on storage medium 121*b*.

In this example, it may be necessary to adjust a backup schedule of the remote databases 119*b* as a function of the backup frequency of the local database 119*a* or of the target application 117. The backup frequency of the remote databases 119*b* might, for example, be limited to a minimum backup frequency no less than the minimum backup frequency of the local database 119*a*.

Other embodiments of the present invention may comprise backup frequencies or schedules that comprise, but are not limited to, a function of more than one backup schedule, a function of a characteristic of an external information source, or a function of combinations of other parameters, such as a time of day, a physical location of a computing resource, a power or environmental constraint, a characteristic of a storage device or of a stored data structure, a user usage pattern, or a feature of a software entity, a computing platform, a means of electronic communications, or a computing environment.

Many other embodiments of the present invention are possible, some of which are described in the figures below. Dependencies and other relationships among applications and databases, and among backup schedules associated with the applications and databases, may be topologically complex. In some embodiments, synchronization issues between dissimilar types of backup schedules may create additional conditions upon backup requirements for applications and databases. In other cases, two applications or databases that do not otherwise depend upon each other may be related by a common dependency upon a third application or database. In one example, a nuanced analysis may be needed to reconcile a first backup schedule of a backup mechanism that backs up an application prior to every patch installation with a second backup schedule of a backup mechanism that backs up a database once a day.

All embodiments of the present invention comprise a method of backing up an application, where the method identifies and backs up a database that is identified as a function of a first relationship between the database and the application, and where the database's backup schedule is a function of a second relationship between the database and the application.

Figure 2:
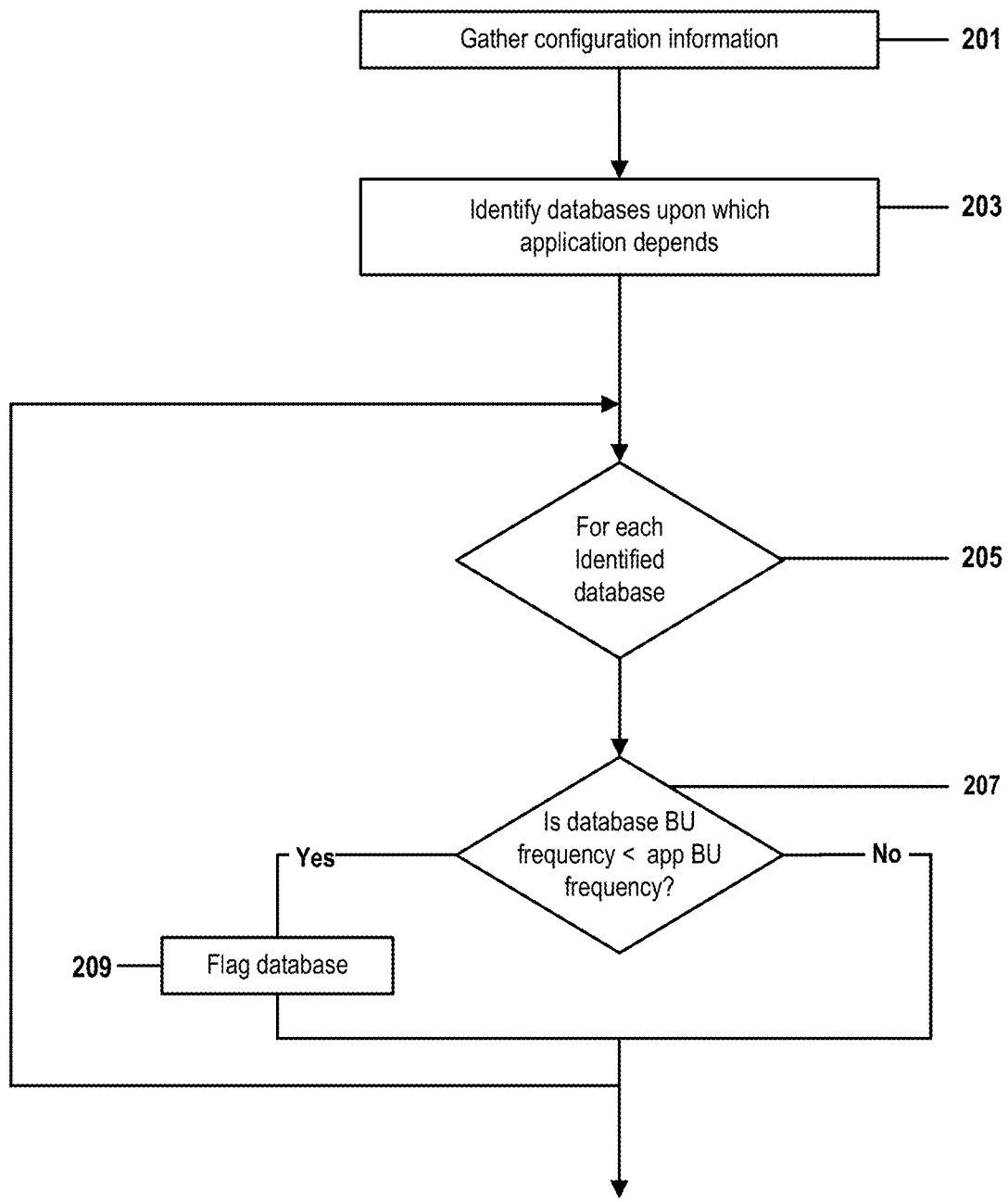
FIG. 2 is a flow chart of a backup program within the computer system of FIG. 1 for backing up databases used directly or indirectly by a target software application in accordance with an embodiment of the present invention.

FIG. 2 is a flow chart of a backup program within the computer system of FIG. 1 for backing up databases used directly or indirectly by a target software application in accordance with an embodiment of the present invention. FIG. 2 comprises steps 201-209.

In step 201 of FIG. 2, backup program 107 queries one or more configuration files 118 of target application 117 to identify databases (for example, local database 119a) accessed directly by application 117, or to identify software applications (for example, applications 114a and 116a) used by application 117 to respond to service requests of application 117. A system administrator or developer of application 117 previously entered confirmation information into configuration file 118 to specify which databases will provide specified types of information to application 117 and which other applications will receive specified service requests from application 117.

Here, a configuration file 118 may comprise any combination of information sources from which may be inferred a relationship between target application 117 and other software entities. Many types of information sources known to those skilled in the art of system administration may serve as a configuration file within this context, including a data dictionary, a network-management document like a topology map, an ontology of a knowledgebase, or a database log that lists storage volumes related to certain database records or fields, so long as such information sources can be used to identify databases directly accessed by the target application and other applications called by the target application. Other types of configuration-information sources known to those skilled in the arts of system administration or information technology include the output of a software tool or utility, such as an infrastructure-discovery tool, an application-discovery tool, a business-process model, a script or program, or a network-management system. A configuration-information source may further comprise information culled from a combination of manually created document known to those skilled in the art of information technology, such as a topology map, a workflow diagram, or a disaster-recovery plan.

In one example, the computing environments of FIG. 1 and FIG. 1A are part of a service-oriented architecture (SOA) infrastructure that conforms to architectural conventions known to those skilled in the art of information technology. According to these conventions, the infrastructure comprises a service registry configuration file 118 that identifies addresses of applications that correspond to application types needed by application 117. In such a framework, if application 117 queries the configuration file/service registry 118, requesting a specified type of application or service, the service registry 118 would respond with an address of a requested application 114 that provides the specified type of service, thereby allowing application 117 to directly call the requested application 114. In this example, program 107 can identify dependencies and relationships associated with application 117 by scanning through the code of application 117 for calls to the service registry 118 and the types of applications specified in the calls, and query the service registry for the addresses of the applications that correspond to the application types specified by the calls. Next, program 107 scans through the code of the applications identified in the service registry that correspond to the calls in the target application 117 for calls by these identified applications to the service registry 118 and the types of applications specified in these calls by the identified applications. Next, program 107 queries the service registry for the addresses of the applications that correspond to the application types specified by the calls in the identified applications. In this way, program 107 is able to identify databases, application components, and other types of information sources, including requested application 114, that application 117 directly or indirectly uses. Next, program 107 queries configuration files for each of the applications and databases directly and indirectly used by application 117 to determine their respective backup frequencies, and determine if they meet the minimum backup frequency specified by contract or best practices, or otherwise use this information to further identify the backup frequency of the applications identified by the service registry.

Similar methods, known to those skilled in the art of information technology and system administration, may be used to identify dependencies and other relationships associated with target application 117 by examining other types of configuration files.

In some embodiments, program 107 would then, by means of a similar procedure, examine configuration files associated with identified applications, such as requested application 114 and 116, in order to identify all databases (for example, databases 119) used by applications 114 and 116 and thus indirectly related to target application 117. This process would continue to an arbitrary number of levels that is a function of the goals and implementation details of the embodiment.

In step 201, the backup program 107 gathers information about the target application. As described above, this information may include, but is not limited to, configuration information and settings associated with the application, requirements of the application that are related to the integrity or timeliness of data or content associated with the application, information about the application's backup schedule or backup mechanism, or other characteristics or requirements of a means to ensure the integrity of the application and of the information it depends upon. This information may comprise a minimum backup frequency, which identifies a lowest acceptable frequency with which the application, and the information upon which the application may depend, may be backed up.

This gathering may take place through any means known to those skilled in the art of information technology or computer science. It may comprise, but is not limited to, analyzing configuration files, vendor or product documentation, implementation documentation, network topologies or other characteristics of a communications system, or a revision level, requirement, or other specification of a hardware or software entity. This analyzing may be performed manually, under the control of a human operator, or by an automated or semi-automated process.

In some embodiments, data-gathering may comprise discovering, collecting, collating, or relating information from multiple management tiers or other directly or indirectly related sources. In such cases, correlating and relating such information may comprise steps that strive to resolve inconsistencies by comparing information gathered from independent sources. In some embodiments, inconsistencies may be resolved in part through a method of prioritizing some or all of such independent sources as being more or less definitive, timely, or trustworthy. Such sources may comprise, but are not limited to, manually or automatically collected network topologies, lists of networked entities, performance analyses or other types of technical analyses, or descriptions of business organizations or structures.

In some cases, the correlating and relating may comprise examining or analyzing information that is indexed or identified by parameters that may comprise, but are not limited to, IP addresses, host names, asset identifiers, infrastructure identifiers, and other characteristics of an operating platform or domain.

In some embodiments, the correlating and relating may comprise correlating data retrieved from multiple management-information sources familiar to those skilled in the art of system administration. Such sources may comprise combinations of, but are not limited to, server-management systems, storage-management systems, network-management systems, asset-management systems, and backup-management systems. In such embodiments, the correlating and relating may comprise reconciling identities of entities identified by the multiple management information sources, where it is not known if the multiple sources had associated identical entities with identical identifiers.

When only partial, outdated, or insufficient data is available from the multiple management-information sources, the correlating and relating may further comprise performing a statistical analysis according to a method known to those skilled in the art of data-analysis or system administration, such as a confidence-interval analysis, upon the retrieved data in order to further identify extrapolated information that would otherwise be unavailable from the multiple management-information sources.

In step 203, the backup program 107 gathers further information by means of one or more mechanisms similar to or analogous to the information-gathering mechanisms of step 201. This further information identifies a set of databases, application sub-components, information repositories, or other information sources that store information upon which the target application may depend. The further information may also identify a characteristic of the application's backup schedule, backup mechanism, and other means to ensure the integrity of a database or of the contents of the database.

This information may further comprise a characteristic of a relationship between the target application and one or more databases of the set of databases, where the relationship may describe a dependency of the target application upon information stored in the database, or upon a characteristic of information stored in the database, where the characteristic might comprise, but is not limited to, the date and time when the information was last updated, the source of such an update, the date and time when the information was last backed up, the destination or destinations of such a backup, a minimum update frequency, and a minimum backup frequency.

In step 205, the backup program 107 begins an iterative process that comprises steps 205-209 and that is performed once for each dependent database identified in step 203. Each iteration of this iterative process is associated with a minimum database-backup frequency identified in step 201 or 203.

In step 207, the backup program 107 begins determines whether the minimum database-backup frequency is less than the minimum backup frequency of the target application. Hit is less, then the database may be backed up less often than the target application that depends upon information in the database.

In some embodiments, other criteria may be considered in addition to, or instead of, a simple comparison between these two backup frequencies. Step 207 may, for example, further consider the relative timing or synchronization of the database's backup schedule and of the application's backup schedule. Many other criteria are possible, depending upon implementation details and goals of system administrators.

The backup program 107 performs step 209 if the database's minimum backup frequency is less than the application's minimum backup frequency that is, if the application may be backed up more frequently than a database upon which it depends. In this case, the database is flagged or otherwise identified to indicate that a responsible party may need to increase the frequency of the database's backups such that the database is backed up at least as often as is the target application. In some embodiments, backup program 107 automatically adjusts a backup frequency of a database manager, or automatically sends a request to a database manager change the backup frequency.

In some embodiments, other or additional factors may be considered when determining whether or how to adjust the backup schedule of the flagged database. In one example, even if both the flagged database and the application are backed up hourly, the database's schedule may be adjusted such that the database and application are always backed up at the same time each hour. Here, such an adjustment might ensure, not only that the database's stored information is current relative to the application's stored data, but also that the two sets of information are contemporaneous.

When the backup program 107 has performed the iterative process of steps 205-209 has been performed for all databases identified in step 203, the iterative process ends and the method of FIG. 2 is complete. At this point, the method of the present invention will have identified each database that stores information upon which the target application depends, and will have flagged or otherwise identified any databases that are associated with backup schedules that may compromise the integrity of the target application should the target application and the databases need to be restored from backups.

Figure 3A:
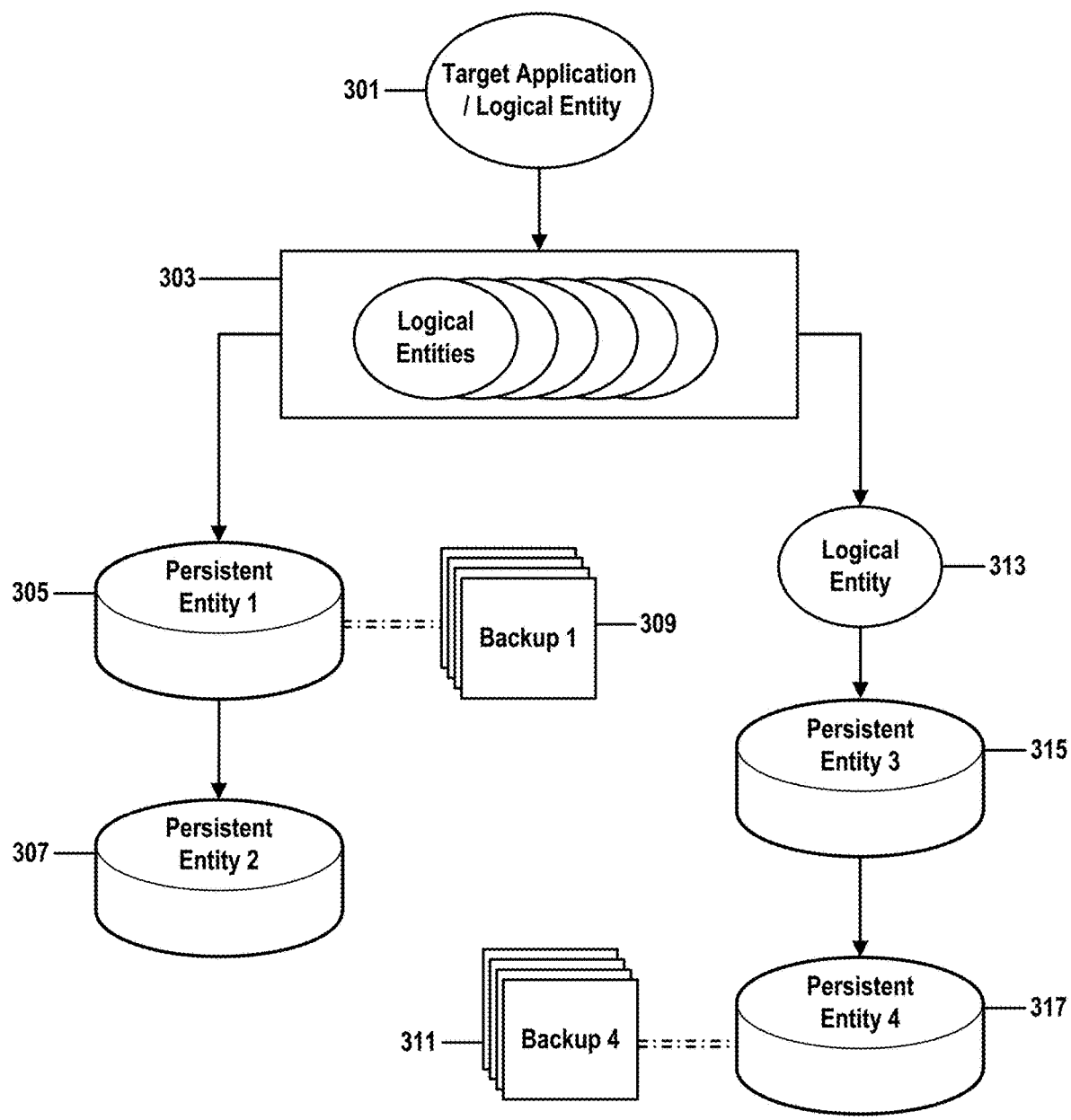
FIG. 3A illustrates the topology and data flows of a generalized embodiment of the present invention.

FIG. 3A illustrates the topology and data flows of a generalized embodiment of the present invention as a directed graph. Each node of the directed graph represents an entity of the computing environment as either a logical entity, such as a running computer program or a record of information retrieved from a database or log, or as a persistent entity, such as a disk drive that stores a copy of a database or log. A dependency between two entities is represented as an arrow between the nodes associated with the two entities. A double dotted line represents a relationship between two entities, wherein one of the entities comprises a backup of the other entity.

Item 301 represents a logical entity to be backed up by an embodiment of the present invention. In some embodiments, this logical entity may be similar to target application 117 to be backed up by backup program 107, as described in FIG. 1 and FIG. 1A, but it may also be a logical component of a software entity to be backed up. In some embodiments described herein, this entity may comprise one or more target software applications and related information.

Item 303 represents a set of logical entities that comprise information upon which target application 301 depends. In one example, a logical entity of the set of logical entities 303 might be a record of information that the application 301 retrieves from a database and displays to a user. In other examples, the logical entity might be a local database maintained by the target application 301. In yet other examples, the logical entity might comprise an other sub-component of the target application 301, as described above.

Item 313 represents another distinct logical entity that may be comprised by or associated with the target application 301 or the set of logical entities 303. Embodiments of the present invention may be implemented in a broad range of computing environments or network topologies. In such environments and topologies, logical and persistent entities may be related by many types of dependencies and other relationships. The structure shown in FIG. 3A is intended to illustrate a simple example of how logical entities and persistent entities may be related to a target application, but should not be construed to limit the range of computing environments or topologies in which the present invention may be implemented.

Items 305, 307, 315, and 317 represent physical or virtual persistent entities, such as physical storage devices or physical or virtual partitions, that may store copies of one or more information repositories. One or more of these information repositories may be associated with a backup mechanism that comprises a backup schedule or a minimum backup frequency and that backs up all or part of the information stored in the one or more information repositories to a physical backup medium, such as the exemplary backup media shown as items 309 and 311.

Embodiments of the present invention may flag one or more of the information repositories 305, 307, 315, and 317 as requiring adjustment of the flagged repository's associated backup schedule or minimum backup frequency.

Figure 3B:
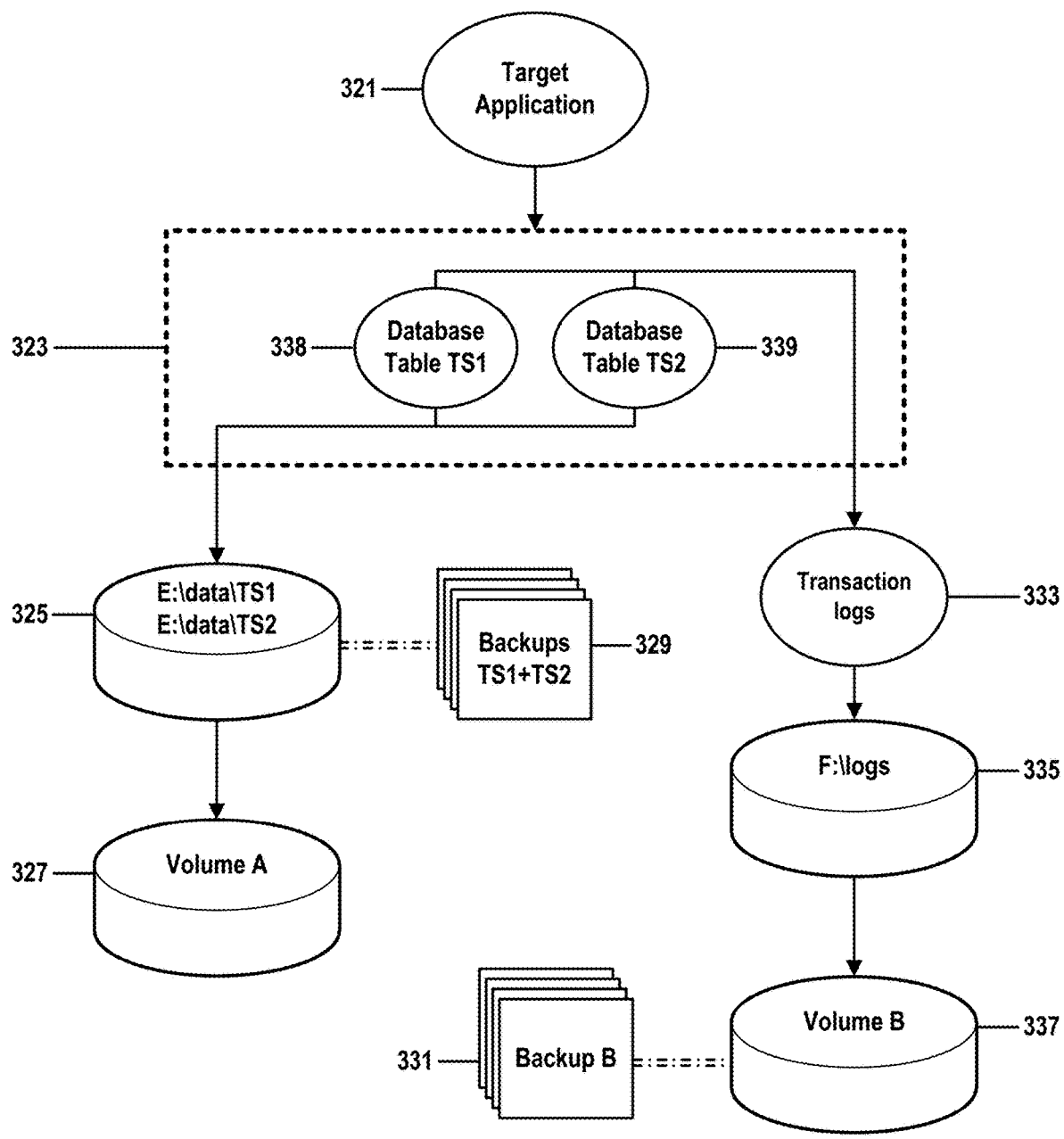
FIG. 3B illustrates the topology and data flows of a specific embodiment of the present invention shown in FIG. 3A.

FIG. 3B illustrates the topology and data flows of a specific embodiment of the present invention shown in FIG. 3A. FIG. 3B comprises items 321-339.

Item 321 represents a logical entity to be backed up by an embodiment of the present invention, such as one or more software applications and associated information. In some cases, an application of the one or more applications may comprise a local application information repository, such as a local database that stores local copies of information used by the application. In some embodiments, this logical entity 321 may be similar to target application 117 to be backed up by backup program 107, as described in FIG. 1 and FIG. 1A, but it may also be a logical component of a software entity to be backed up.

Item 323 represents a set of logical entities that comprise sub-components of target application 321 and that may store information upon which target application 321 depends. In this example, two logical entities are shown: local database table TS1 338 and local database table TS2 339. These tables contain information used directly by application 321 and that depends upon information retrieved from databases stored on physical or virtual persistent storage medium 325. In some embodiments, target application 321 may comprise a database that in turn comprises tables TS1 338 and TS2 339.

Item 325 represents a persistent storage medium that stores folder/information repository E:\data\TS1, from which the application 321 retrieves information comprised by database table TS1 338, and that further stores folder/information repository E:\data\TS2, from which the application 321 retrieves information comprised by database table TS2 339. Here, information repositories E:\data\TS1 and E:\data\TS2 are each associated with one or more backup mechanisms that comprise a repository-specific backup schedule and a repository-specific minimum backup frequency.

Item 329 represents one or more backup media to which the one or more backup mechanisms back up all or part of the information stored in folder/information repositories E:\data\TS1 and E:\data\TS2 325. These backups may be performed according to repository-specific backup schedules or repository-specific minimum backup frequencies.

Item 327 represents a storage volume that stores the E: partition of item 325. In some embodiments, 327 might be a virtual disk created by a hypervisor program from resources that comprise a physical volume.

Item 333 represents a log of transactions performed by application 321 upon information in database table TS1 338 or database table TS2 339. This log of transactions may be created and maintained by the target application 321 or by a distinct transaction-logging application.

These logged transactions 333 may be used to generate reports and to perform other functions. They may also be used to help ensure that, should the information of tables TS1 338 and TS2 339 need to be restored from backup 329, any transactions that were not captured in backup 329 may be restored from the log. Such a mechanism might require that the tracked information in log 333 be backed up with greater frequency than the information stored in the data tables on repository 325. In this scenario, should a catastrophic outage occur, application 321 would first be relaunched and then database tables TS1 338 and TS2 339 would be restored from backups 329, Finally, any transactions that occurred after backup 329 was created would be restored to database tables 338 and 339 from the more recent backup of the transaction log 333.

Item 335 represents a persistent storage medium that stores folder/information repository F:\logs, which stores a persistent copy of the transaction logs 333. The application's transaction logs 333 thus depend upon the information stored in repository 335.

Item 337 represents a physical or virtual persistent storage volume that stores the F: partition of item 335. In some embodiments, 337 might represent a virtual disk created by a hypervisor program from resources that comprise a physical volume.

Item 331 represents one or more backup media to which the one or more backup mechanisms back up all or part of the information stored in storage volume 337. This information includes the folder/information repository F:\logs 335. These backups may be performed according to a repository-specific or a volume-specific backup schedule or according to a repository-specific or a volume-specific minimum backup frequency, and these backup schedules and minimum backup frequencies may be a function of one or more characteristics of the target application 321 or of the logging application 333.

FIG. 2 and FIG. 3B illustrate a simple example of how an embodiment of the present invention may perform the method of FIG. 2 within the computing environment of FIG. 3B in order to back up application 321.

In these examples, an embodiment might identify topology and relationships shown in FIG. 3B by analyzing information stored in system-management tools known to those skilled in the art, where such tools might comprise combinations of an asset-management system, a network-management system, a server-management system, a storage-management system, and a backup-management system.

Such an analysis might reveal details of the backup mechanisms of FIG. 3 items 329 and 331, and might further reveal dependencies of the target application 321 upon the local database tables 338 and 339, the dependencies of tables 338 and 339 upon stored table repositories 325 and transaction logs 333, the dependencies of the repositories 325 upon volume A 327, and the dependencies of the transaction log 333 upon repository F:\logs 335 and volume B 337.

Such an analysis might further reveal details of the backup mechanisms that comprise minimum backup frequencies associated with folders E:\data\TS1 and E:\data\TS2 on 325 and of a minimum backup frequency associated with volume B 337.

Other aspects of the analysis might comprise analyzing business-management processes or workflows in order to determine whether specific entities in the computing environment of FIG. 3B perform mission-critical functions, to determine how current information stored in or provided by specific entities must be in order to satisfy business goals, to determine how often an application or repository's data is updated, or to determine how often data upon which an application or repository depends is updated.

The result of this analysis might be a directed graph like the one shown in FIG. 3B, but in other embodiments, the resulting analysis might be represented in other ways known to those skilled in the art.

In this example, embodiments of the present invention might next analyze the backup frequency as a function of the backup frequency of the application or application database 321. This function might be as simple as ensuring that databases and other information repositories upon which application 321 depends are backed up at least as often as the application itself.

In other embodiments, this function might be more complex, accounting for factors like the time and resources necessary to perform a replication/backup or a transmission of data between entities; the criticality of frequency of update of an information repository; the criticality of application 321; the existence of multiple dependencies among several tiers of information repositories and applications; security, access-authorization, or data-protection issues; time-variable parameters like time of day, day of week, or day of year; resource-utilization issues; environmental, cost, or power issues; or other implementation-dependent or business-dependent factors familiar to those skilled in the art of information technology, data management, disaster recovery, or system administration.

In the simple example of FIG. 3B, application 321, which performs transactions that update its local database tables 338 and 339 hundreds of times a second, depends upon the transaction logs 333, which are backed up to medium 331. If database repository 325 is backed up no less than hourly to media 329 and transaction-log information on volume B 337 is backed up no less than twice daily, then the method of FIG. 2 will determine that the minimum backup frequency of volume B 337 is less than the minimum backup frequency of the application 321 that depends upon volume B 337. Volume B 337 would thus be flagged as requiring an adjustment to its minimum backup frequency.

In one scenario, a system administrator or an automated utility might respond to an indication of the flagging by manually or automatically adjusting the minimum backup frequency of volume B 337 to be no less than the minimum backup frequency of application 321. In this simplest embodiment, the method of FIG. 2 would then adjust the backup frequency of volume B 337 to be hourly.

Because application 321 processes hundreds of transactions per second, ensuring that the most current backup of application 321's transaction log is no more than an hour old may not be sufficient to ensure a desired level of integrity of application 321. More sophisticated embodiments of the present invention may therefore use more nuanced functions to adjust the minimum backup frequency of flagged log/database 333 via backups of volume B 337.

Some embodiments may, for example, increase the backup frequency of the flagged log/database to the maximum value possible within resource constraints of the computing platform. Other embodiments may select a minimum backup frequency as a function of the results of a statistical analysis that selects an optimal compromise between backup frequency and data integrity.

Many other functions and methods may be used to select an adjusted backup frequency, backup pattern, or backup mechanism based on the analysis of the method of FIG. 2, where these functions and methods are known to those skilled in the art of disaster recovery, information recovery, system analysis, or system administration, and where such functions and methods may be based all or in part upon characteristics of the software or hardware components of the computer environment or infrastructure, upon other implementation details, upon business considerations and goals, or upon other intrinsic or extrinsic characteristics of the specific implementation and embodiment.

Figure 4:
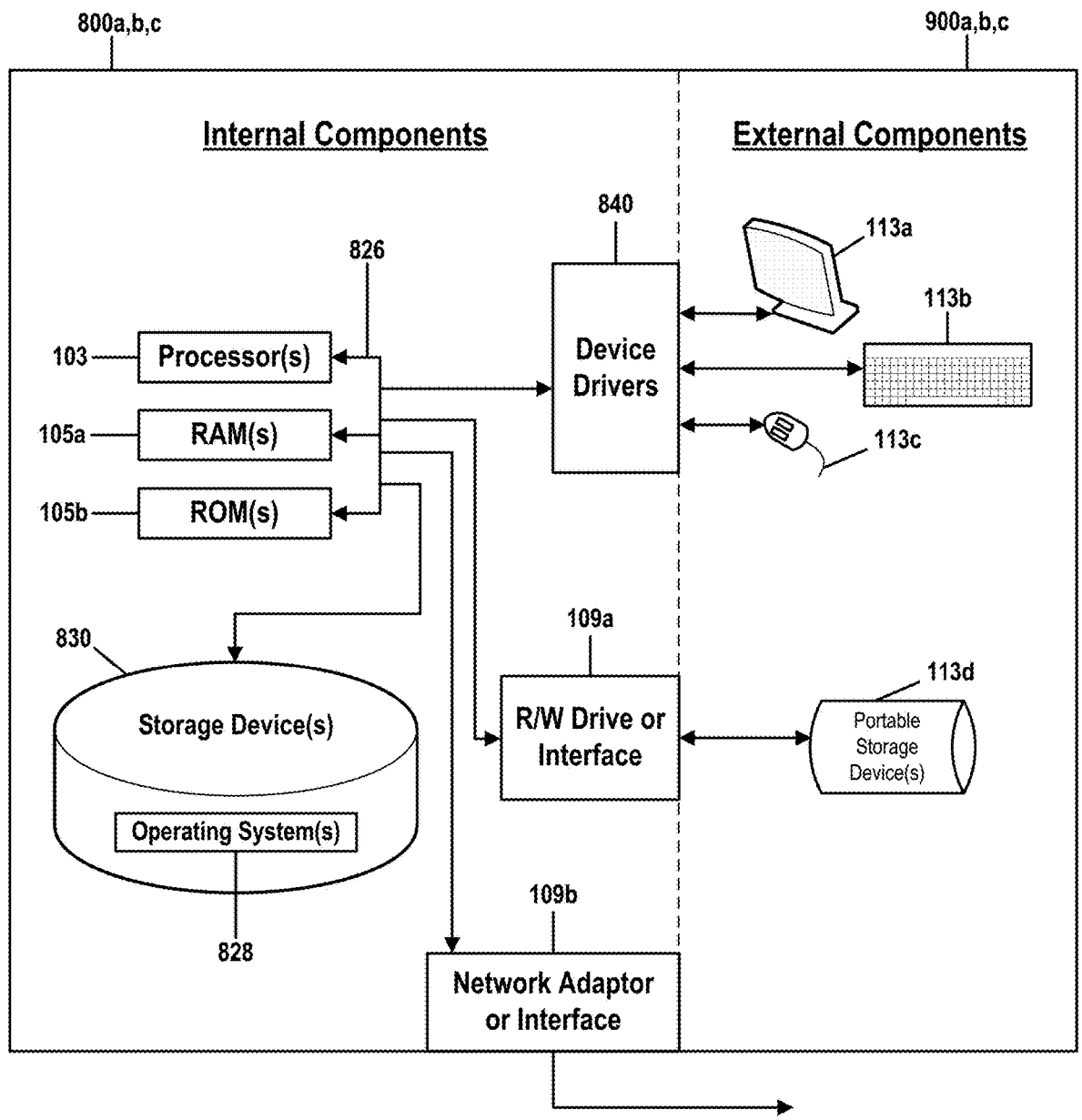
FIG. 4 illustrates computer hardware and programs within the computer system shown in FIG. 1.

FIG. 4 illustrates a computer apparatus, comprising computer hardware and program code, within the computer system shown in FIG. 1. This computer apparatus includes sets of internal components 800a,b,c and sets of external 900a,b,c. Each of the sets of internal components 800a,b,c includes one or more processors 101, one or more computer-readable RAMs 105a, and one or more computer-readable ROMs 105b on one or more buses 826, one or more operating systems 828 and one or more computer-readable storage devices 830. The one or more operating systems 828 and backup program 107 on computer 101 for backing up a target application are stored on one or more of the respective computer-readable storage devices 830 for execution by one or more of the respective processors 101 via one or more of the respective RAMs 105a (which typically include cache memory). In the illustrated embodiment, each of the computer-readable storage devices 830 is a magnetic disk storage device of an internal hard drive. Alternatively, each of the computer-readable storage devices 830 is a semiconductor storage device such as ROM 105b, EPROM, flash memory, or any other computer-readable storage device that can store but does not transmit a computer program and digital information.

Each set of internal components 800a,b,c also includes a R/W (rewriteable) drive or interface 109a to read from and write to one or more portable computer-readable storage devices 113d that can store but do not transmit a computer program, such as a CD-ROM, DVD, memory stick, magnetic tape, magnetic disk, optical disk or semiconductor storage device. The program instructions 107 on computer 101 for backing up a target application can be stored on one or more of the respective portable computer-readable storage devices 113d, read via the respective R/W drive or interface 109a, and loaded into the respective hard drive or semiconductor storage device 830. The term "computer-readable storage device" does not encompass signal-propagation media such as copper cables, optical fibers and wireless transmission media.

Each set of internal components 800*a,b,c* also includes a network adapter or interface 109*b*, such as a TCP/IP adapter card or wireless communication adapter (such as a 4G wireless communication adapter using OFDMA technology). The program instructions 107 can be downloaded to the respective computing/processing devices from an external computer or external storage device via a network (for example, the Internet, a local-area network, or other, wide-area network or wireless network) and network adapter or interface 109*b*. From the network adapter or interface 109*b*, the programs are loaded into the respective hard drive or semiconductor storage device 830. The network may comprise copper wires, optical fibers, wireless transmission, routers, firewalls, switches, gateway computers, and/or edge servers.

Each of the sets of external components 900*a,b,c* may include a display screen 113*a*, and one or more input mechanisms, such as a keyboard or keypad 113*b* and a computer mouse or touchpad 113*c*. Each of the sets of internal components 800*a,b,c* also includes device drivers 840 to interface to display screen 113*a* for imaging, to keyboard or keypad 113*b*, to computer use or touchpad 113*c*, and/or to display screen for pressure sensing of alphanumeric character entry and user selections. The device drivers 840, R/W drive or interface 109*a* and network adapter or interface 109*b* comprise hardware and software (stored in storage device 830 and/or ROM 105*b*).

The programs can be written in various programming languages (such as Java or C+), including low-level, object-oriented or non object-oriented languages. Alternatively, the functions of the programs can be implemented in whole or in part by computer circuits and other hardware (not shown).

Based on the foregoing discussion, a computer system, method and program product have been disclosed for managing the back-up of database used directly or indirectly by a target application. However, numerous modifications and substitutions can be made without deviating from the scope of the present invention. Therefore, the present invention has been disclosed by way of example and not limitation.

What is claimed is:

1. A method for enhancing robustness of a database application, the method comprising:
   determining, by a processor of a database-management system, that a first application, in response to a user query, has queried a second application;
   selecting, by the processor, a second-application database that must be accessed by the second application in order for the second application to respond to the query by the first application;
   identifying, by the processor, a current backup frequency for the second-application database;
   detecting, by the processor, that the current backup frequency for the second-application database is less than a minimum backup frequency specified for the first application; and
   increasing, by the processor in response to the detecting, the current backup frequency of the second-application database to at least the minimum backup frequency.

2. The method of claim 1, where the increasing further comprises:
   electronically directing, by the processor, a database-management application of the second-application database to automatically increase the backup frequency of the second-application database to the minimum backup frequency.

3. The method of claim 1, where the determining is performed by identifying a dependency between the first application and the second application.

4. The method of claim 3, where the dependency is identified from data retrieved from an information source selected from the list consisting of a data dictionary, a topology map, an ontology of a knowledgebase, a database log, a output of an infrastructure-discovery tool, an output of an application-discovery tool, a business-process model, a workflow diagram, an automated disaster-recovery plan, and a service registry of a computing system implemented as a service-oriented architecture.

5. The method of claim 3, where the dependency is a function of a business consideration or goal.

6. The method of claim 3, where the dependency is identified by correlating data retrieved from multiple management-information sources, where a source of the multiple management-information sources is chosen from the group comprising a server-management system, a storage-management system, a network-management system, an asset-management system, and a backup-management system, where the correlating comprises reconciling identities of entities described by the multiple management information sources, and where the correlating further comprises performing a statistical confidence-interval analysis upon the retrieved data in order to further identify extrapolated information unavailable from the multiple management-information sources.

7. The method of claim 1, where the first-application database and the second-application database may each comprise: a combination of local and remote information repositories; a file system; a distributed software application; a component of a backup mechanism; or a virtual or physical computing-infrastructure component.

8. The method of claim 1, further comprising providing at least one support service for at least one of creating, integrating, hosting, maintaining, and deploying computer-readable program code in a computer system, where the computer-readable program code in combination with the computer system is configured to implement the determining, the selecting, the identifying the detecting, and the increasing.

9. A computer program product, comprising a computer-readable hardware storage device having a computer-readable program code stored therein, said program code configured to be executed by a processor of a database-management system to implement a method for method for enhancing robustness of a database application, the method comprising:
   determining, by the processor, that a first application, in response to a user query, has queried a second application;
   selecting, by the processor, a second-application database that must be accessed by the second application in order for the second application to respond to the query by the first application;
   identifying, by the processor, a current backup frequency for the second-application database;
   detecting, by the processor, that the current backup frequency for the second-application database is less than a minimum backup frequency specified for the first application; and
   increasing, by the processor in response to the detecting, the current backup frequency of the second-application database to at least the minimum backup frequency.

10. The computer program product of claim 9, where the increasing further comprises:

electronically directing, by the processor, a database-management application of the second-application database to automatically increase the backup frequency of the second-application database to the minimum backup frequency.

11. The computer program product of claim 9, where the determining is performed by identifying a dependency between the first application and the second application.

12. The computer program product of claim 11, where the dependency is identified from data retrieved from an information source selected from the list consisting of a data dictionary, a topology map, an ontology of a knowledgebase, a database log, a output of an infrastructure-discovery tool, an output of an application-discovery tool, a business-process model, a workflow diagram, an automated disaster-recovery plan, and a service registry of a computing system implemented as a service-oriented architecture.

13. The computer program product of claim 11, where the dependency is a function of a business consideration or goal.

14. The computer program product of claim 11, where the dependency is identified by correlating data retrieved from multiple management-information sources, where a source of the multiple management-information sources is chosen from the group comprising a server-management system, a storage-management system, a network-management system, an asset-management system, and a backup-management system, where the correlating comprises reconciling identities of entities described by the multiple management information sources, and where the correlating further comprises performing a statistical confidence-interval analysis upon the retrieved data in order to further identify extrapolated information unavailable from the multiple management-information sources.

15. A database-management system comprising a processor, a memory coupled to said processor, and a computer-readable hardware storage device coupled to said processor, said storage device containing program code configured to be run by said processor via the memory to implement a method for method for enhancing robustness of a database application, the method comprising:
   determining, by the processor, that a first application, in response to a user query, has queried a second application;
   selecting, by the processor, a second-application database that must be accessed by the second application in order for the second application to respond to the query by the first application;
   identifying, by the processor, a current backup frequency for the second-application database;
   detecting, by the processor, that the current backup frequency for the second-application database is less than a minimum backup frequency specified for the first application; and
   increasing, by the processor in response to the detecting, the current backup frequency of the second-application database to at least the minimum backup frequency.

16. The database-management system of claim 15, where the increasing further comprises:
   electronically directing, by the processor, a database-management application of the second-application database to automatically increase the backup frequency of the second-application database to the minimum backup frequency.

17. The database-management system of claim 15, where the determining is performed by identifying a dependency between the first application and the second application.

18. The database-management system of claim 17, where the dependency is identified from data retrieved from an information source selected from the list consisting of a data dictionary, a topology map, an ontology of a knowledgebase, a database log, a output of an infrastructure-discovery tool, an output of an application-discovery tool, a business-process model, a workflow diagram, an automated disaster-recovery plan, and a service registry of a computing system implemented as a service-oriented architecture.

19. The database-management system of claim 17, where the dependency is a function of a business consideration or goal.

20. The database-management system of claim 17, where the dependency is identified by correlating data retrieved from multiple management-information sources, where a source of the multiple management-information sources is chosen from the group comprising a server-management system, a storage-management system, a network-management system, an asset-management system, and a backup-management system, where the correlating comprises reconciling identities of entities described by the multiple management information sources, and where the correlating further comprises performing a statistical confidence-interval analysis upon the retrieved data in order to further identify extrapolated information unavailable from the multiple management-information sources.

* * * * *